Dec. 25, 1956  L. E. SODERQUIST  2,774,990
INJECTION MOLDING PRESS

Filed March 28, 1951  5 Sheets-Sheet 1

INVENTOR.
LESLIE E. SODERQUIST
BY

ATTORNEYS

Dec. 25, 1956   L. E. SODERQUIST   2,774,990
INJECTION MOLDING PRESS
Filed March 28, 1951   5 Sheets-Sheet 2

INVENTOR.
LESLIE E. SODERQUIST
BY
ATTORNEYS

Dec. 25, 1956     L. E. SODERQUIST     2,774,990
INJECTION MOLDING PRESS
Filed March 28, 1951     5 Sheets-Sheet 3

INVENTOR.
LESLIE E. SODERQUIST
BY
ATTORNEYS

Dec. 25, 1956 L. E. SODERQUIST 2,774,990
INJECTION MOLDING PRESS

Filed March 28, 1951 5 Sheets-Sheet 4

INVENTOR.
LESLIE E. SODERQUIST
BY
ATTORNEYS

Dec. 25, 1956 L. E. SODERQUIST 2,774,990
INJECTION MOLDING PRESS
Filed March 28, 1951 5 Sheets-Sheet 5
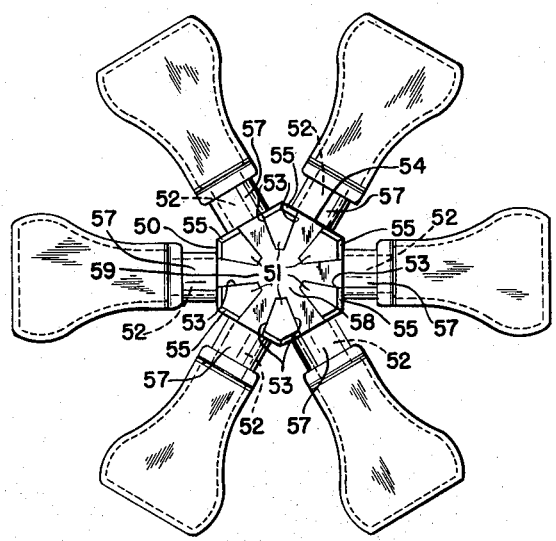
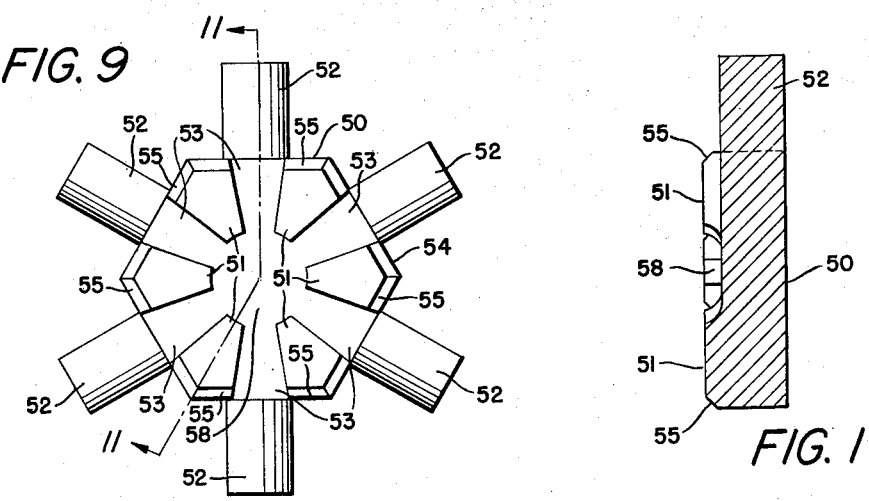
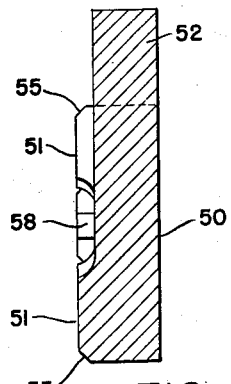
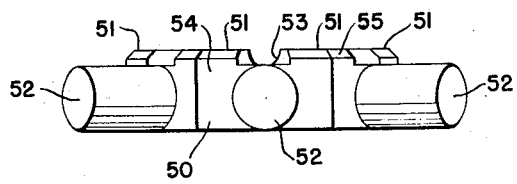
INVENTOR.
LESLIE E. SODERQUIST
BY
ATTORNEYS

United States Patent Office 2,774,990
Patented Dec. 25, 1956

2,774,990

INJECTION MOLDING PRESS

Leslie Edward Soderquist, Akron, Ohio, assignor to The McNeil Machine and Engineering Company, Akron, Ohio, a corporation of Ohio Application March 28, 1951, Serial No. 218,027

3 Claims. (Cl. 18—30)

The present invention relates to the construction of presses for the molding of articles formed of rubber, thermosetting plastics, and the like. The press shown and described herein is of the so-called injection molding type in which a charge of the plastic material is forced into the mold cavity or cavities while the mold is closed. Presses of this general type have been used for many years in the molding of rubber and plastics and they have many advantages over the older types of presses in which a measured charge of the plastic material is placed in each mold cavity while the press is open.

The press of the present invention is particularly designed for the molding of small articles in large quantities and is characterized by the fact that these articles are economically molded in groups or clusters in multiple cavity molds, the cavities of which are grouped around a central area, at which point the several articles are connected by a web or sprue.

One of the major objects of the invention is to improve upon the operation of removing the finished articles from the mold cavities. Briefly stated, the improvement consists in expelling the articles from the half of the mold in which they would be retained after the press is opened by means of the web or sprue connecting the articles. The operation of ejecting the articles by the connecting web is performed by the piston which had previously forced the stock into the mold cavities.

Where the articles are hollow and require it, a core member may be employed which has branches or extensions leading into the several cavities, but the press is usable for the molding of solid articles in which no core member is required.

It is a further object of the invention to improve upon the means for injecting the raw plastic material into the mold. A further object is the construction of a press in which the piston which forces the plastic material into the mold cavities, likewise ejects the molded articles from the molds.

A further object of the invention is to provide an easy way in which bits of plastic material which find their way into the pressure chambers for operating the injecting plungers may be removed. In the operation of presses of this type, plastic material may be forced around the plungers, and it is essential that such waste material be cleaned out periodically.

Further objects are to simplify and improve upon the construction and mode of operation of presses of this type and to provide for mass production at low operating costs.

In the drawings, there are shown those parts of a press of the improved design which are necessary for a full understanding of the features of novelty. The mechanism for raising and lowering the upper platen and top half of the mold and holding it against the pressure of the injecting mechanism is not illustrated for the reason that any well known type of operating mechanism may be employed. The press may be of the hydraulic type, but it is preferred to use any well known toggle mechanism to raise and lower the upper platen.

The particular embodiment of the invention which has been selected for showing the principles thereof is for the manufacture of articles requiring a core member to form certain hollow parts thereof, but it is to be understood that such a device is employed only when the articles have formations requiring the use of a core. The mold cavity and core shown is for the making of insulating caps or shields which fit over battery terminals and these are shown as molded in groups or clusters of six. However, any type of article may be molded in any grouping with appropriate changes in mold design and core design, if necessary.

For molding larger articles, single cavity molds may be necessary or desirable and the principles of the invention may be adapted to such operations. Certain principles of the invention may be applied to presses for curing one article in an individual mold. It is desired, however, to show the invention as incorporated in a press for handling a number of mold units for great economy in operation.

The invention is illustrated for hot molding operations such as would be used with rubber or rubber-like materials or thermo-setting plastics. For cold pressing operations the application of heat would not be used.

Other changes and modifications may be made in the details of the press without departing from the principles of the invention or sacrificing any of its benefits. The invention is expressed in the claims and is not limited beyond the scope thereof to any specific construction and design shown and described herein.

In the drawings, in which the best known and preferred form of the invention is illustrated:

Fig. 7 is a sectional detail, looking at the underside of the core, showing the cluster of articles as it is removed with the core, the view being taken on the line 7—7 of Fig. 4.

Fig. 9 is a view looking at the underside of the core which is used in the particular molding operation depicted.

Fig. 10 is a side view of the core.

Fig. 11 is a section on the line 11—11 of Fig. 9.

Figure 1:
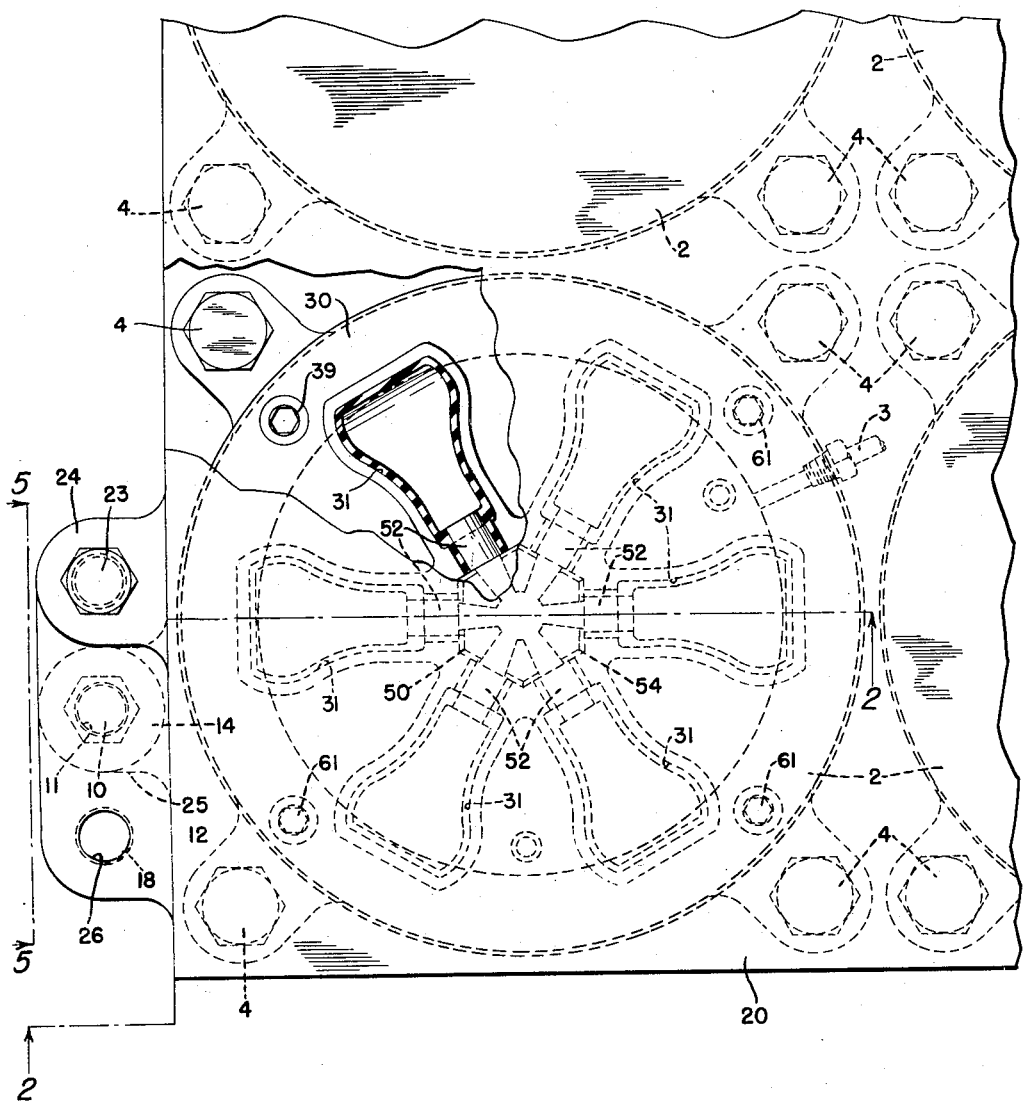
Fig. 1 is a view looking down on the upper platen, certain portions of the press being broken away. This view shows one corner section of the upper platen only, it being understood that the area of the press may cover any desirable or operative extent.

In the drawings, the base or bed plate of the press is given the reference numeral 1. As noted above, the bed plate may have any area or extent which may be practical and only a fragment thereof is shown. One mold in full and fragments of others are shown, indicating that a multiplicity of molds may be accommodated in the single press.

Secured to the bed plate by bolts 4 are of a number of cylinders 2 equal to the number of mold units which are to be employed. Piping 3 conducts fluid pressure, preferably pneumatic, to each cylinder to move the plunger up and down in the cylinder. Around the upper edge of each cylinder is a ledge 5 and seated on the top of the cylinder is the lower platen 7, the underside of which is provided with annular grooves 8 to receive the ledges 5. As shown, the lower platen is cored out for the circulation of steam. The bed plate, cylinders, and lower platen are bolted together by means of heavy machine bolts 10, which pass through holes 11 in lugs 12 formed around the sides of the platen 7. The lower threaded ends of bolts 10 are received in threaded holes in the tops of pillars 14 which are secured to the bed plate 1 by bolts 15 passing through lugs 16 located around the edges of the bed plate.

Figure 5:
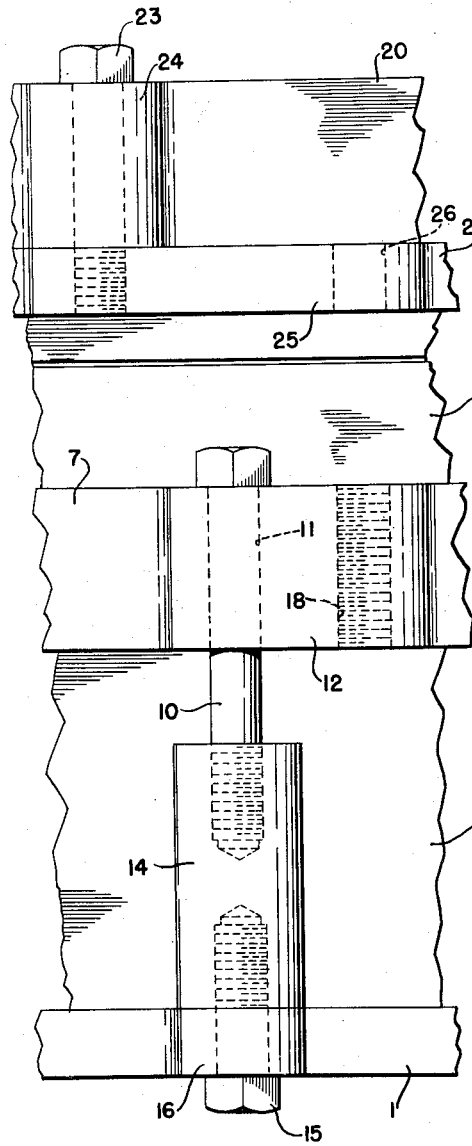
Fig. 5 is a view on the line 5—5 of Fig. 1.
Figure 6:
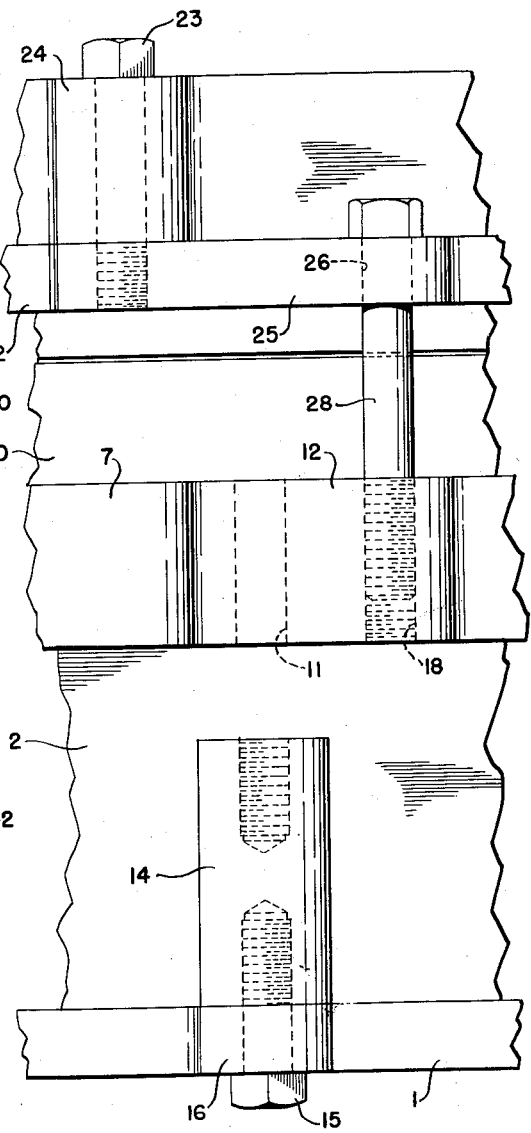
Fig. 6 is a similar view but showing the manner in which the press is coupled for cleaning out the pressure cylinders.

It will be noted that the lugs 12 are extended as shown in Figs. 5 and 6, and that a threaded hole 18 is provided in each lug alongside the hole 11, the purpose of which is to arrange for the lifting of the lower platen for facilitating the cleaning out of the pressure cylinders, as will be described.

The upper platen, which is likewise cored out for the circulation of steam, is given the reference numeral 20. As shown by the arrow A in Fig. 2, the upper platen is carried by mechanism which raises and lowers it, the extent of travel being sufficient to completely clear the lower platen and permit access thereto. A mold plate 22 is fastened to the lower face of the platen 20 by bolts 23 which pass through lugs 24 on the sides of the platen and are threaded into lugs 25 on the sides of the mold plate.

As shown in Figs. 5 and 6, the lugs 25 extend over the holes in the lugs 12 and in alignment with each threaded hole 18 is a passage 26 in the lug 25. When the press is in operation, the parts are located as shown in Fig. 5, but when it is desired to clean out the cylinders, which should be done periodically, the several bolts 10 are disconnected from the pillars 14 and bolts 28 are passed through the several holes 26 and threaded into the holes 18. This connects the upper and lower platens, and when the upper platen is raised the lower platen 7 and the parts carried thereby are lifted from the bed plate and the operator may clean out the debris that may have collected in the cylinders. It is a valuable feature of the press that the pressure cylinders are thus so easily accessible for cleaning.

The lower platen carries the lower halves of the molds which are indicated as a whole by the numeral 30. The lower half of the mold shown in Fig. 2 has a plurality of cavities 31 to form one side of each article, and from the center of the mold a heavy sleeve 32 depends which is seated in a bore 33 in the lower platen located centrally of the cylinder 2. Reciprocable in each cylinder is a piston 34, on the lower face of which is carried the plate 35 through spring urged bolts 36 which pass through the piston and serve to compress a packing ring 38 between opposed surfaces on the piston and on the plate. Each lower mold half is secured to the platen 7 by bolts 39.

The piston rod 40 extends into the sleeve 32, where it is provided with a plunger 42. In its lowered position, the plunger 42 closes the lower end of a large chamber 44, in which the charge of raw plastic material is loaded while the press is open. When the plunger is raised to the dotted line position shown in Fig. 2, the charge of rubber or other plastic material is forced out of the chamber 44 into the several molds, it being noted, however, that when the plunger is at the top of the chamber 44 there is still possible a substantial degree of upward travel of the plunger.

The core is indicated as a whole by the numeral 50. As the articles shown herein have short, hollow neck portions 57, the core is made with a number of radiating arms 52 equal to the number of cavities in the lower mold section (in the present showing this is a six-cavity mold) and the arms are equally spaced about the core. Each arm 52 extends from one side of a hexagonal center block, indicated by the numeral 54, the lower, outside edge of which is beveled as shown at 55 to fit a hexagonal bevel seat 56 cut in the top of the lower mold 30 around the top of the chamber 44.

The underside of the center block 54 is formed with raised areas 51 at each corner of the block which rest upon the lower mold seat 56 and center the core therein. Between these ledges are channels 53 which lead to the several mold cavities, these channels meeting in a central area 58 which forms the main part of the sprue.

It will be seen that when the plastic material is transferred from the chamber 44 to the several mold cavities, it will fill the central area 58 and the channels 53 radiating therefrom and this will form a central web or sprue connecting all of the articles in the several mold cavities. This sprue is given the numeral 59 in Fig. 2. It is the means by which the articles are removed from the mold cavities at the end of the molding operation. In the example shown, the stripping of the articles is assisted by the core member, but this is not essential as articles made without cores are likewise removable from the mold cavities. The essential feature is that a certain portion of the complete article, whether it be a part of the finished article or a sprue or web which is subsequently trimmed therefrom, is in the path of the ejector which, in this case, is the plunger which was used to transfer the plastic material into the mold cavities.

Each upper mold half is indicated at 60 and is secured to the mold plate 22 by bolts 61. The underside of each upper mold is formed with rounded cutaway portions 63 which, with the arms 52 on the core, form the sleeves on the several articles. Radially outward of these cutaway portions, the upper mold half has formed thereon the raised surfaces 65 which enter the mold cavities 31 to form the bodies of the articles. At the center of the upper mold half is the flat bearing surface 66 which rests against the core 50 when the mold is closed, if a core is used. If a core is not used, the lower side of the surface 66 will form the upper molding surface for the sprue and will be extended toward the chamber 44 is a sufficient distance to form a sprue of the requisite thickness.

Figures 2, 8:
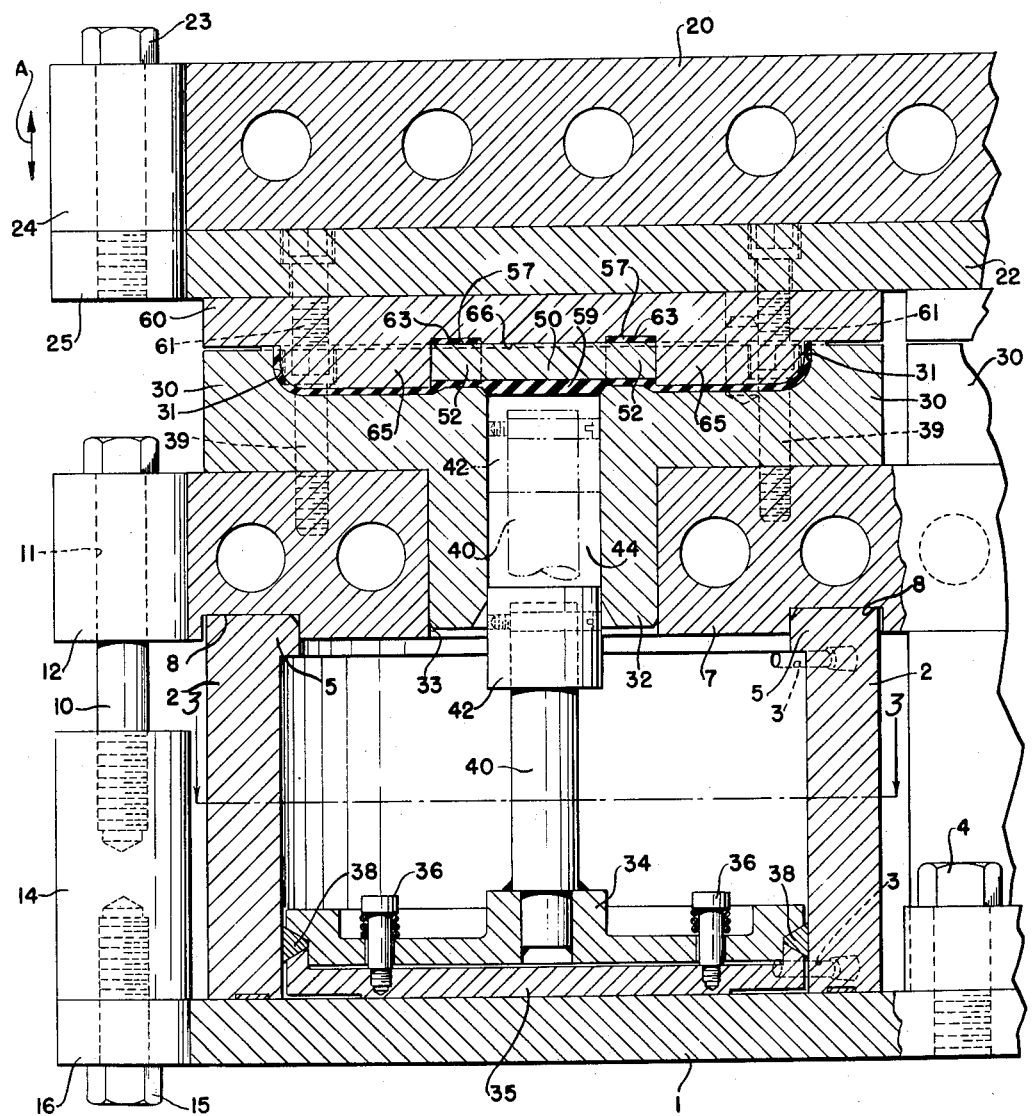
Fig. 2 is a vertical section on the line 2—2 of Fig. 1, the press being closed.
Fig. 8 is a profile of the upper mold section.

In operation, when the press is open and the several cores are out of their seats 56 in the lower molds, a charge of plastic material, sufficient to fill all the mold cavities of a group, is placed in each chamber 44, the cores are set in place, and the upper platen is brought down under pressure to the position shown in Fig. 2, which closes the mold cavities on all sides. By suitable control mechanism, the plunger 42 is now raised to the upper limit of its injecting movement which is shown by the dotted line position of the plunger in Fig. 2, where the top of the plunger is level with the top edge of the chamber 44. If a core is employed, as in the form shown, this upward movement of the plunger will be limited by the surfaces 51. If a core is not employed, the upward movement of the plunger during the injecting operation may be limited by contact with the overlying portion of the upper mold, provided that the requisite passages for the plastic material are provided either in the underside of the mold or in the upper side of the plunger. Whatever system is employed, the plastic material will be forced into the mold cavities and a sprue will be formed between the top of the plunger and the surface of the upper mold. In the form illustrated, the sprue is formed at each mold by the plastic material which is forced into the area 58 and through the channels 53.

After the material has been given time to vulcanize or set, while the upper platen is held in lowered position, the upper platen is raised, exposing the finished articles in the lower mold and on the arms 52. The plunger 42 is now raised to its uppermost position, being arrested by the overhanging ledges 5. This operation lifts the group or cluster or articles out of the several mold cavities by the central sprue 59, to which all of the articles are attached by the radiating arms formed in the channels 53. The core piece 50 is raised with the cluster. The cluster of articles can now be removed from the press and stripped from the core pieces 50, which are replaced after the plungers 42 are retracted and a new charge inserted. The articles are then severed from the central sprue or web and given such further trimming as may be necessary.

The various steps in the press operation may be regulated by any of the well known timing devices so that, after the operator places the charges in the several cavities 44 and sets the cores in place, all that is required is that he operate a starting button and the press will function to carry out the cycle.

Figures 3, 4:
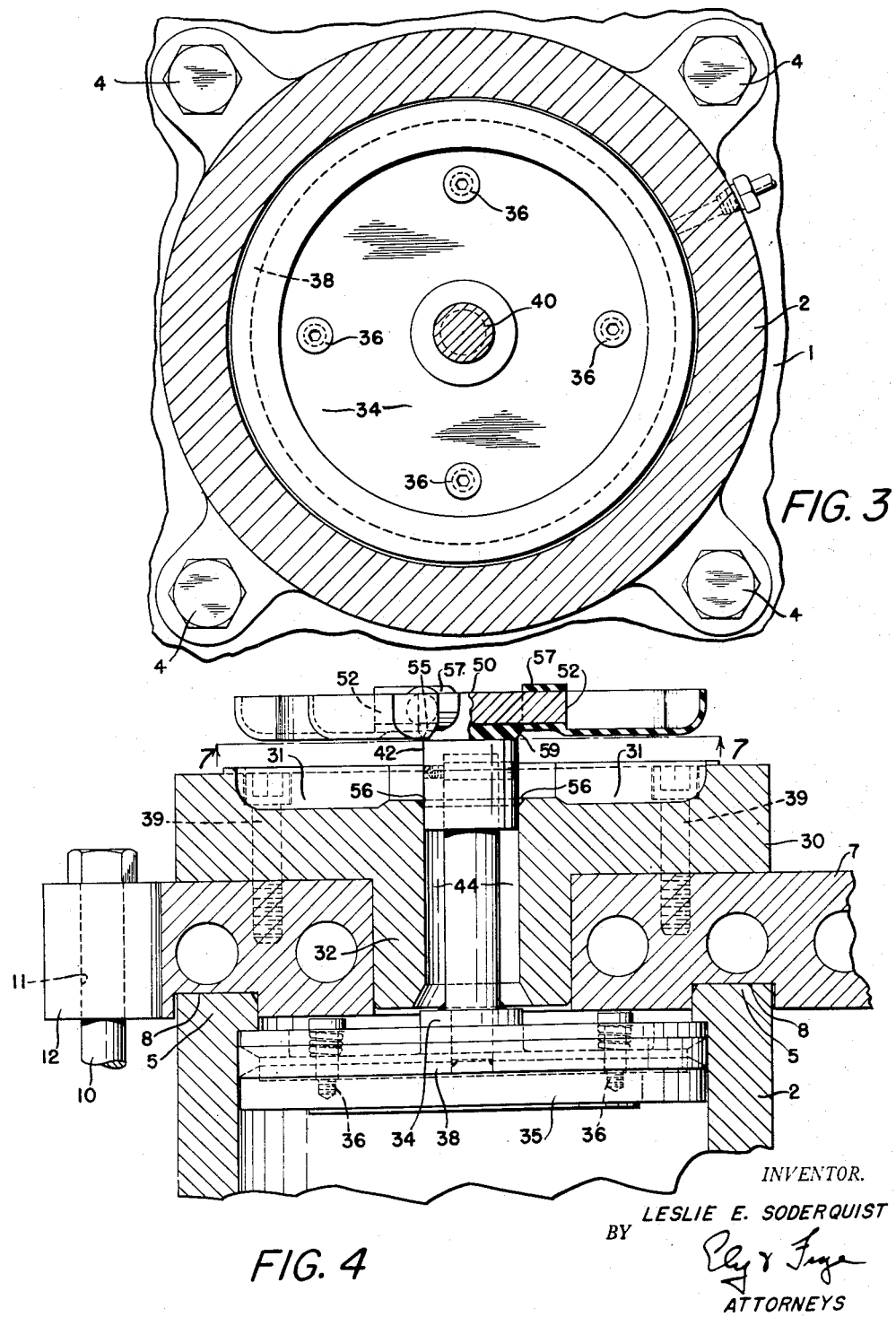
Fig. 3 is a section on the line 3—3 of Fig. 2.
Fig. 4 is a section of the lower half of the mold, the upper platen and upper mold section being removed to open the press and the plunger having been raised to strip the molded articles from the lower half of the mold.

It will be noted that the upward movement of the plunger to the position shown in Fig. 4 not only strips the articles from the lower mold cavities, but it also serves to scavenge the chamber 44.

As has been noted above, some of the plastic material will be forced around the plungers 42 and find its way into the cylinders 2. It is essential that this material be not permitted to accumulate in the cylinders, and the cleaning out of the cylinders is facilitated by raising of the lower platens, as has been described.

It will be seen that the press shown and described herein permits of very rapid mass production. The press is labor saving and the method of stripping the articles from the lower mold cavities is a great improvement over known means and methods. The amount of waste is reduced to a minimum and the maintenance is very low.

It will be understood that the press is adaptable for the molding of many types of articles and the designing of the mold cavities and cores, and the arrangement of the cavities are matters of engineering only. Where the term "plastic" is used in the claims, it is intended to cover all types of material which are moldable in injection presses of the general type set forth. The press is shown in position with the molding cavities horizontal, but this is a matter of design, and where the terms "upper" and "lower" are used in the claims, these terms are used in the relative sense only.

What is claimed is:

1. A press for molding articles by the injection method comprising upper and lower platens movable relatively to one another, complementary mold sections carried on the platens, a chamber to receive a charge of plastic material in communication with the space between the mold sections, a bed plate, releasable means to secure the lower platen to the bed plate, and means to connect the two platens for joint movement when the lower platen is released from the bed plate.

2. A press for molding articles by the injection method comprising upper and lower platens movable relatively to one another, complementary mold sections carried by the platens, a bed plate, a chamber carried by the bed plate and adapted to receive a charge of plastic material, the upper end of the chamber being covered by the lower platen, a passage through the lower platen leading to the mold cavity, means to transfer the plastic material from the chamber to the mold cavity, releasable means holding the lower platen on the bed plate, and means to connect the two platens for joint movement when the lower platen is released from the bed plate.

3. A press for molding a plurality of articles by the injection method comprising upper and lower platens movable relatively to one another, a plurality of mold sections carried by each of said platens, a bed plate, a plurality of chambers carried by the bed plate and adapted to receive charges of plastic material, the upper ends of the chambers being covered by the lower platen, passages through the lower platen leading to the mold cavities, means to transfer the plastic material from the chambers to the mold cavities, releasable means holding the lower platen on the bed plate, and means to connect the two platens for joint movement away from the bed plate when the lower platen is released to expose the interior of the chambers and the spaces between the chambers.

References Cited in the file of this patent

UNITED STATES PATENTS

| Number | Name | Date |
|---|---|---|
| 1,865,464 | Geyer | July 5, 1932 |
| 1,997,074 | Novotny | Apr. 9, 1935 |
| 2,020,669 | Williams | Nov. 12, 1935 |
| 2,198,493 | Freeman | Apr. 23, 1940 |
| 2,330,369 | Marsh | Sept. 28, 1943 |
| 2,420,405 | Alves | May 13, 1947 |
| 2,446,872 | Ehlers | Aug. 10, 1948 |
| 2,490,625 | Hall | Dec. 6, 1949 |
| 2,501,329 | Hall | Mar. 21, 1950 |